Aug. 6, 1957  M. P. GUSSACK  2,801,887
SHOCK LOCK BLOCK
Filed Aug. 9, 1954
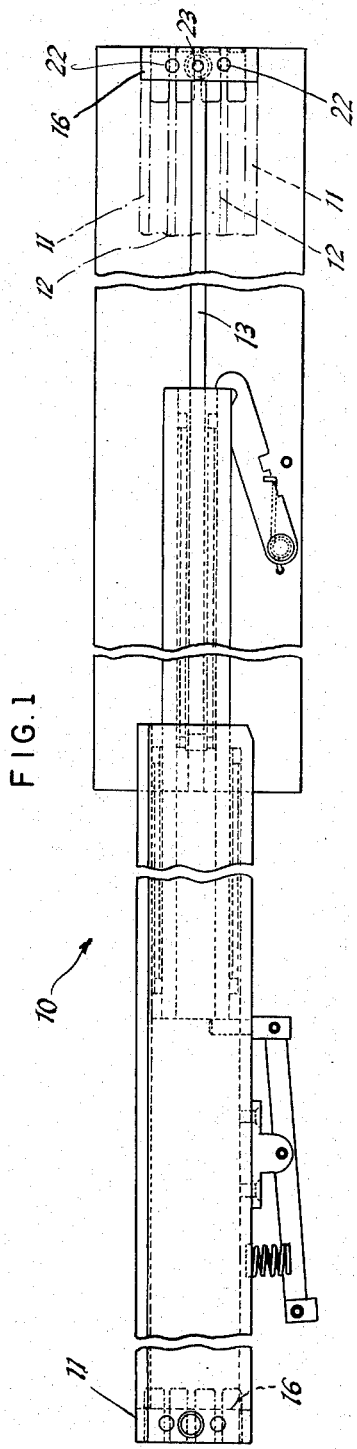
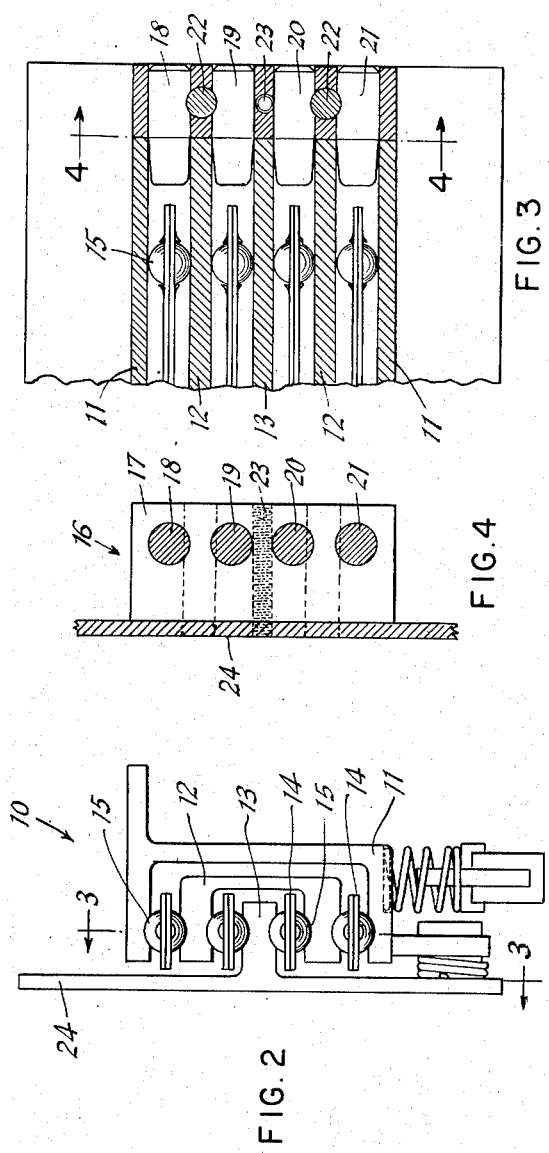
INVENTOR.
Milton P. Gussack
BY
Irving Seidman
ATTORNEY

United States Patent Office 2,801,887
Patented Aug. 6, 1957

2,801,887

SHOCK LOCK BLOCK

Milton P. Gussack, Flushing, N. Y., assignor to Grant Pulley & Hardware Corporation, Flushing, N. Y., a corporation Application August 9, 1954, Serial No. 448,716

3 Claims. (Cl. 308—3.8)

This invention relates to shock lock blocks used in association with slides.

Broadly, it is an object of the invention to provide slides with a means to prevent vibration and wear of the members of the slides, such as the channel and track members to eliminate noise, stress and wear.

More particularly, it is an object of the invention to provide a pair of shock lock blocks for a slide at the front and rear thereof to act upon the center track and the movable channel and track members to grip and spread such members when in closed position. This keeps the weight off the steel balls thus avoiding the making of indents in the softer metal tracks and channels and eliminates vibration, noise and wear.

Heretofore, in slides with ball spacers, if the balls remained in a stationary position indents would be created in the softer metal tracks and channel members. Vibration would further wear the tracks and channel members causing additional wear. When the balls would roll over the indents, the movement would be rough and cause noise. In closed position the end balls would create larger or deeper indents, and to open a drawer attached to such slides, a greater force would have to be exerted to dislodge the balls from the indents so made. Furthermore, some of the balls in traveling over the slides would travel over successive indents causing rough operation and noise. By providing the slides with a pair of shock lock blocks, the life of the slides are extended and the slides operate more quietly and could stand more vibration in closed position.

For a fuller understanding of the nature and objects of the invention, reference is had to the following detailed description in connection with the accompanying drawings, in which:

Fig. 1 is a side elevational view of a slide containing shock lock blocks.

Fig. 2 is an end view of the slide shown in Fig. 1 in closed position.

Fig. 3 is an enlarged sectional view showing one end of a slide in closed position with a shock lock block attached to the slide.

Fig. 4 is a sectional view taken through line 4—4 of Fig. 3.

Referring to the drawings, numeral 10 represents a slide, which is shown for illustrative purposes only since many types of slides may have the shock lock blocks applied, which are the subject matter of the invention. The slide 10 comprises an outer channel 11, an inner channel 12, a center track 13 and ball spacers 14 containing balls 15. Since the balls are made of hardened steel and the channels and track are of softer metal, such as aluminum, it is evident that if the balls rest upon the track and channels, especially when the outer channel bears the weight of a chassis (not shown), indents are created in each of the channels 11 and 12 and the track 13 when the slide is in closed position. Such indents make for rough and noisy operation and requires more force to open a drawer or pull out a chassis to which such slides are attached.

In order to take the strain of the balls 15 off the channels 11, 12 and track 13, the shock lock blocks 16 are attached to the ends of the slide 10 as will be hereinafter described.

The shock lock block 16 comprises a metal block 17 having a series of slightly tapered pins 18, 19, 20, 21, slidably fitted and positioned in holes in block 17 spaced apart slightly less than the thickness of the channels 11, 12 and the track 13 and such pins are adapted to receive such track and channel members therebetween when the slide is in closed position. In Figs. 1 and 2, it will be clearly seen that the outer channel 11 is held by pins 18, 21, the inner channel 12 between pins 18, 19 and 20, 21 and the center track 13 between pins 19, 20. The slight taper of the pins grip the track and channel members spreading the channel members slightly holding them against vibration and keeping the weight of the track and channels off the balls thus avoiding the creation of indents in the track and channels when the slide is in closed position. The pins 18, 19, 20 and 21 are fixed in position in the block 17 by dowel pins 22. As stated, the block 17 is attached to the center track plate 24 by screw 23 and dowel pins 22 pass through holes in plate 24 to provide greater rigidity for the assembly. The center track 13 ends before the end of the center track plate 24 the same distance as the thickness of block 17 so that the block 17 abuts the end of the center track 13 and is flush with the end of the center track plate 24. Another shock lock block 16 is similarly attached to the end of the outer channel member 11, as shown in Fig. 1 and operates in the manner previously described. The pins 22 may protrude from either side of the block 17 depending upon the application.

It is obvious a pair of shock lock blocks are used on each slide and that various changes and modification may be made in the details of construction and arrangement of parts of such shock lock blocks without departing from the general spirit of the invention.

I claim:

1. A slide having sliding members and balls therebetween, in combination with a pair of shock lock blocks attached to opposite ends of each slide, said pair of shock lock blocks each having projections, said projections being spaced to grip said sliding members when said slide is in closed position to keep the weight of said slide members off said balls and prevent excessive vibration of each member.

2. The slide in accordance with claim 1, wherein said projections are tapered.

3. The slide in accordance with claim 1, wherein said blocks have holes for receiving and adjustably seating said projections, and dowel pins for firmly fixing said projections in said blocks.

References Cited in the file of this patent

UNITED STATES PATENTS

| | | |
|---|---|---|
| 1,005,055 | Miller | Oct. 3, 1911 |
| 1,566,307 | Card et al. | Dec. 22, 1925 |
| 2,382,363 | Wolters et al. | Aug. 14, 1945 |